United States Patent [19]

Touborg

[11] 4,101,336

[45] Jul. 18, 1978

[54] METHOD OF BURNING PULVEROUS ALKALI-CONTAINING RAW MATERIALS AND KILN PLANT THEREFOR

[75] Inventor: Jørn Touborg, Copenhagen Valby, Denmark

[73] Assignee: F. L. Smidth & Co., Cresskill, N.J.

[21] Appl. No.: 758,428

[22] Filed: Jan. 11, 1977

[30] Foreign Application Priority Data

Jan. 12, 1976 [GB] United Kingdom ............ 962/76

[51] Int. Cl.$^2$ .................................................. C04B 7/02
[52] U.S. Cl. ..................................................... 106/106
[58] Field of Search .......................................... 106/100

[56] References Cited

U.S. PATENT DOCUMENTS

| | | | |
|---|---|---|---|
| 3,864,075 | 2/1975 | Christiansen | 432/106 |
| 3,887,388 | 6/1975 | Christiansen | 106/100 |
| 4,002,420 | 1/1977 | Christiansen | 106/100 |
| 4,022,568 | 5/1977 | Meedom | 106/100 |

Primary Examiner—J. Poer
Attorney, Agent, or Firm—Pennie & Edmonds

[57] ABSTRACT

A method is disclosed for burning alkali-containing raw materials such as cement raw meal in a plant having a multiple string cyclone preheater, each string containing at least two cyclone preheater stages, a kiln, and a cooler unit for cooling the burnt material from the kiln by means of air which is subsequently divided into two streams, one stream being passed through the kiln and a kiln string of the preheater, the other stream being passed through a calciner and up through the calciner cyclone string of the preheater. According to the invention, the flow of material from the penultimate preheater cyclone stage of the kiln string is directed to the calciner, at least a part of the material from the penultimate cyclone stage of the calciner string is directed to the lowermost cyclone stage of the kiln string, and at least a remaining portion of the material from the penultimate cyclone stage of the calciner string is passed to the calciner.

8 Claims, 3 Drawing Figures

METHOD OF BURNING PULVEROUS ALKALI-CONTAINING RAW MATERIALS AND KILN PLANT THEREFOR

BACKGROUND OF THE INVENTION

1. Field of the Invention

This invention relates to a method for burning pulverous alkali-containing raw materials such as cement raw meal, and a plant for practicing the inventive method.

2. Description of the Prior Art

For the sake of convenience the term "impurities" used hereinafter should be understood as comprising not only alkalis but also chlorine and sulphur.

When a preheater is constituted by one string receiving preheating air in the form of waste gas from the kiln and a second string receiving preheating gas through the calciner, impurities in the form of dust or coatings on the material being treated will accumulate in the preheater stages and consequently be liable to create blockages in the cyclones and riser pipes in a critical temperature range. This is particularly so in the kiln string in which the impurity concentrations will be much more critical than in the calciner string due to the volatile impurities released in the kiln.

The reason why blockages are formed is to be found in the fact that when the temperature of the raw materials increases down the cyclones and kiln, the content of alkalis, sulphur and chlorine compounds vaporizes and is drawn with the kiln gases up the cyclones in countercurrent to the raw materials, and when reaching lower temperatures the volatile impurities are liable to condense and solidify on cold surfaces in the preheater or on the raw material particles passing by.

In the condensing phase the impurities cause part of the raw materials to adhere thereto and total blockage will very quickly develop.

It is known to direct part of the kiln gases to the precipitator, by-passing the preheater in order to reduce the impurity content, which would otherwise accumulate. However, there is still a great risk of blocking up the preheater, as the plant preferably should be run with a minimum of by-pass to meet the requirements of economical operation.

The easiest but most expensive way to overcome impurity troubles in the cyclones is to dispose of all of the kiln gases and only to use spent cooling air to preheat the raw material passing down the cyclone preheater. I have invented an improved method of reducing the impurity concentrations in the cyclones and riser pipes, and consequently the risk of blockages.

SUMMARY OF THE INVENTION

The invention relates to a method of burning alkali-containing raw materials in a plant having a multi-string cyclone preheater, each string containing at least two cyclone preheater stages, a kiln, and a cooler unit for cooling the burnt material from the kiln by means of air which is subsequently divided into two streams, one stream being passed through the kiln and a kiln string of said preheater, the other stream being passed through a calciner and up through the calciner cyclone string of said preheater. The inventive method comprises passing the flow of material from the penultimate preheater cyclone stage of said kiln string to said calciner, passing at least a portion of the material from the said penultimate cyclone stage of said calciner string to the lowermost cyclone stage of said kiln string, and passing at least a remaining portion of the material from said penultimate cyclone stage of said calciner string to said calciner.

Thus, according to the invention the flow of material from the penultimate cyclone of the kiln string is directed to the calciner, and at least part of the flow of material from the penultimate cyclone of the calciner string is directed to the bottom cyclone of the kiln string, the remaining part being directed to the calciner.

When a plant is operated in accordance with this new method, impurity-containing material is continuously removed from the kiln string and substituted by preheated raw materials having a smaller content of impurities. Consequently the impurity accumulation in the kiln string is suppressed to a certain degree. Obviously, the impurity content in the calciner string will increase on receiving the more impure material, but the concentration will by no means exceed that of the kiln string.

A further advantage obtained by the crossover-connection of the material flows is that a more impure raw material and a cheaper fuel oil with a higher sulphur content, than at present allowed can be used.

Preferably, the flows of material in the preheater strings should have a mutual mass ratio corresponding to that of the air streams through them, which advantageously could be substantially two thirds of the spent cooling air through the calciner string and substantially one third through the kiln string. Of the air stream passing through the kiln, part may be passed directly on to the kiln string while a second part, amounting perhaps to 15% of the spent cooling air, may be caused to by-pass the preheater and be directed to the atmosphere, or to a precipitator for precipitating impurity-containing dust from the air stream, or to a mill or other device in which the heat contained in that part of the air stream is usefully used by heat exchange.

The invention also relates to a plant for carrying out the new method, the plant comprising a multi-string cyclone preheater which includes a kiln string coupled to the kiln and a calciner string, a calciner connected in a riser pipe to the bottom cyclone of the calciner string, a kiln, a cooler, means for dividing spent cooling air from the cooler and for passing part to the kiln and part to the calciner string, means for directing material from the penultimate cyclone of the kiln string to the calciner, and means for directing material from the penultimate cyclone of the calciner string to the bottom cyclone of the kiln string.

BRIEF DESCRIPTION OF THE DRAWINGS

Preferred embodiments of the invention are described hereinbelow with reference to the drawings wherein:

FIG. 1 shows a conventional double string precalciner but adapted for operation in accordance with the inventior plant with four stages $1k$–$4k$ of a kiln string and, $1c$–$4c$ of a calciner string, in which the raw material to be treated is supplied at $5k$; $5c$ to the riser pipe $6k$, $6c$ and subsequently suspended in the preheating air passing from the second $2k$, $2c$ to the first or uppermost cyclone 1k, 1c. In the first cyclone the material is separated from the gas and fed into the riser pipe connecting the third and the second cyclone and the processes of separation and suspension are subsequently repeated. The preheated material from cyclones 3c and 4k is fed into a calciner 7 in the riser pipe to the cyclone 4c, in which calciner calcination takes place. Calcined material is thereafter passed into the cyclone separator 4c carried by the preheating air from the cooler 8, and separated from the air before being fed into the kiln 9.

Figure 1:
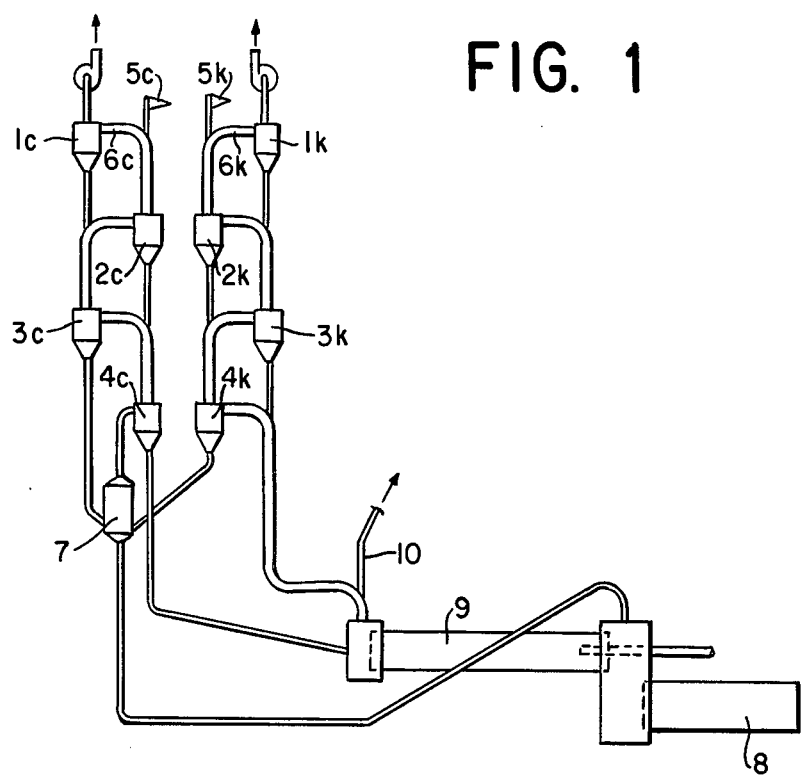
FIG. 1 is a view of a conventional double string, 4-stage precalciner plant.
Figure 2:
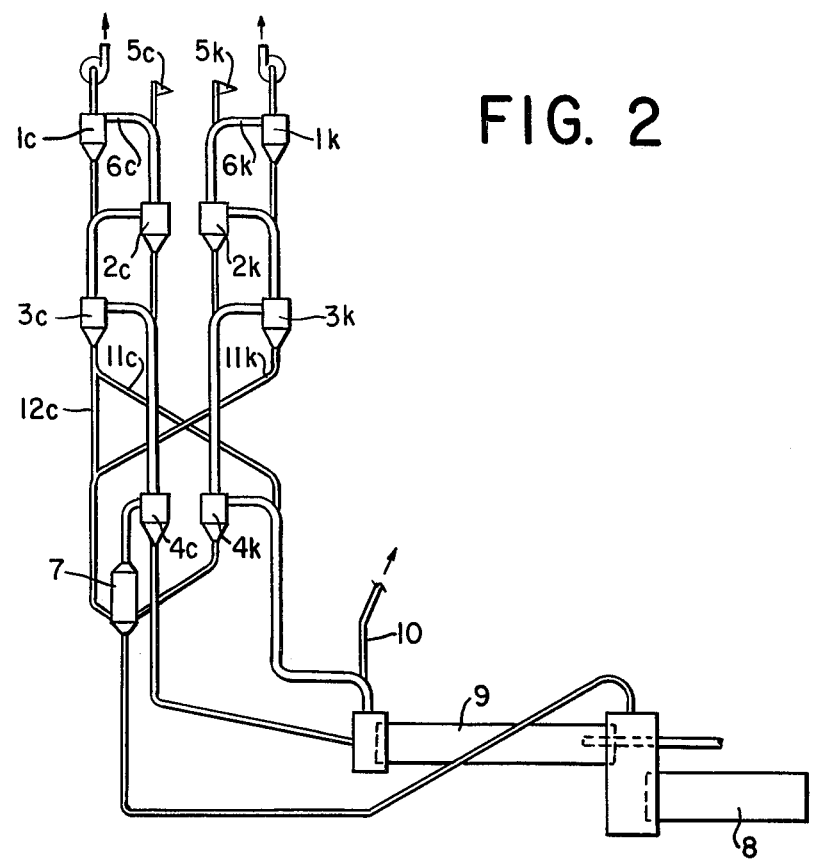
FIG. 2 is a view of a plant constructed in accordance with the present invention.

Turning now to the plant shown in FIG. 2, raw material is preheated and precalcined in substantially the same manner as shown in FIG. 1, but all the material preheated in the cyclone 3k is fed into the calciner 7, and a corresponding amount of the material preheated in the cyclone 3c is fed into the riser pipe connecting the kiln 9 with the cyclone 4k.

In one embodiment of the invention 70% of the cooling air is passed through the calciner string and the remaining 30% is used in the kiln as secondary combustion air. Half of the waste gases by-passes the preheater at 10 and passes through a precipitator, a scrubber, a mill or the like and the other half goes directly up through the kiln string.

The mass ratio between the raw material fed to the kiln string and that fed to the calciner string will be 15:70 and the reduction in chloride accumulation in the kiln string will amount to about 25% when comparing the FIG. 2 plant with the FIG. 1 plant, ceteris paribus.

The corresponding inevitable increase in chloride accumulation in the calciner string will be almost negligible. In the above example it will amount to approximately 1-2%.

Figure 3:
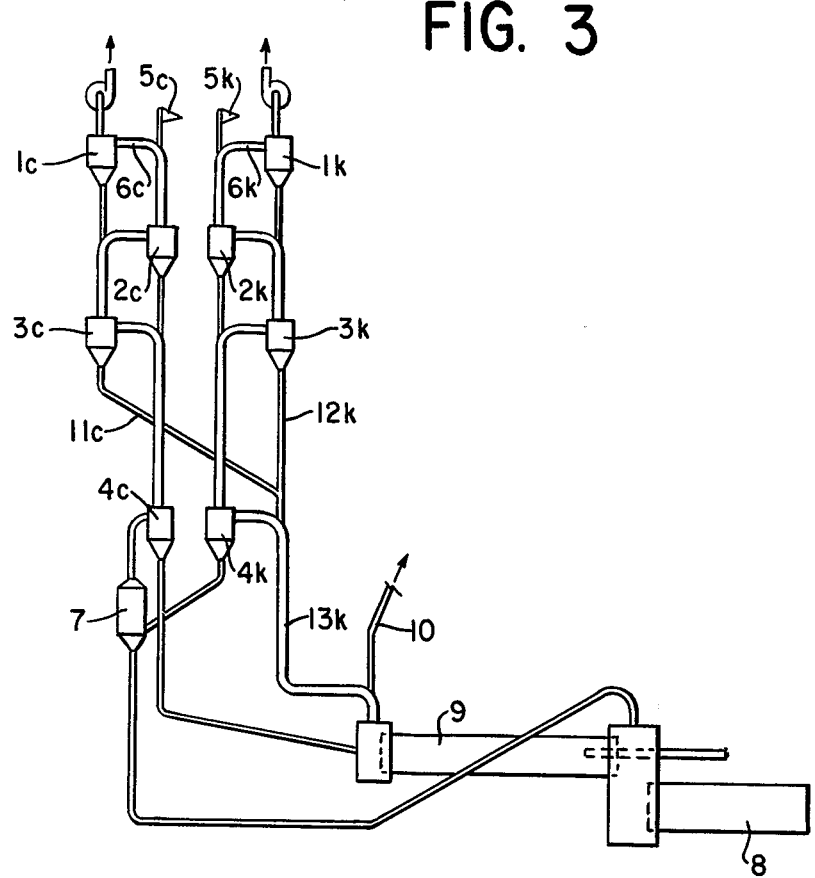
FIG. 3 is a view of another plant similar to that of FIG. 1, but adapted for operation in accordance with the invention.

The plant shown in FIG. 3 could be seen as an intermediate step between the plants in FIGS. 1 and 2. This embodiment of the invention is advantageous in that all of or a substantial part of the preheated raw material is passed from both preheater strings to the riser pipe 13k from the kiln 9 to precipitate the alkali vapours in the kiln exhaust gas on the material particles and separate them from the said gas in cyclone separator 4k at the bottom of the kiln string and recycle them through the calciner 7, the cyclone separator 4c at the bottom of the calciner string back to the kiln 9.

In the FIG. 3 plant the outlet pipe 11c of the penultimate calciner string cyclone 3c is connected to the outlet pipe 12k of the penultimate kiln string cyclone 3k to feed the total amount of raw material into the riser pipe 13K, whereafter all the material to be treated is carried by the kiln gasses to the lowermost cyclone 4k of the kiln string and from here to the calciner 7.

I claim:

1. A method of burning alkali-containing raw materials in a plant having a multi-string cyclone preheater, each string containing at least two cyclone preheater stages, a kiln, and a cooler unit for cooling the burnt material from the kiln by means of air which is subsequently divided into two streams, one stream being passed through the kiln and a kiln string of said preheater, the other stream being passed through a calciner and up through the calciner cyclone string of said preheater, comprising feeding raw material to each preheater string, passing the flow of material from the penultimate preheater cyclone stage of said kiln string to said calciner, passing a portion of the material from the penultimate cyclone stage of said calciner string to the lowermost cyclone stage of said kiln string, passing at least a remaining portion of the material from said penultimate cyclone stage of said calciner string to said calciner, passing material from the lowermost cyclone stage of said kiln string to said calciner, passing the at least partially calcined material from said calciner to the lowermost cyclone stage of said calciner string, and passing the material from the lowermost cyclone stage of said calciner string into said kiln for burning.

2. The method according to claim 1, further comprising directing flows of material in the preheater strings so as to have a mutual mass ratio substantially corresponding to that of the respective air streams directed therethrough.

3. The method according to claim 2, further comprising directing at least approximately one-third of the spent cooling air from said cooler unit to said kiln.

4. The method according to claim 3, further comprising directing to said kiln string of said preheater at least one portion of the air stream passed through said kiln, and bypassing said preheater with a second portion of the air passing through said kiln.

5. The method according to claim 4, further comprising directing the second portion of the air stream from said kiln to at least one of a mill and other means to utilize the heat contained therein by a heat exchange process.

6. The method according to claim 5, further comprising bypassing said preheater with an amount of air from said kiln containing approximately 15% of the spent cooling air from said preheater.

7. A method of burning alkali-containing raw material such as cement raw meal in a plant having a multi-string cyclone preheater, each string containing at least two cyclone preheater stages, a rotary kiln communicating with said preheater, and a cooler unit communicating with said rotary kiln for cooling the burnt material by means of air which is subsequently divided into two streams, one stream being directed through the rotary kiln and up through a preheater string associated with the rotary kiln, the other stream being directed through a calcining chamber and up through a preheater string associated with said calcining chamber, comprising feeding raw material to the uppermost cyclone stage of each preheater string of said preheater, directing the flow of material from the penultimate preheater cyclone stage of said kiln string to said calcining chamber, directing a portion of the material flowing from the penultimate cyclone stage of said calcining preheater string to the lowermost cyclone stage of said rotary kiln preheater string, directing the remaining portion of material from the penultimate cyclone stage of said calcining preheater string to said calcining chamber for at least partially calcining therein, directing material from said lowermost cyclone preheater stage of said rotary kiln string of said preheater to said calcining chamber, directing the at least partially calcined material from said calcining chamber to said lowermost cyclone stage of said calcining preheater string, and directing the material from the lowermost cyclone stage of said calcining preheater string into said kiln for burning.

8. A method of burning pulverous alkali-containing raw materials in a plant having a multi-string cyclone preheater, each string containing at least two cyclone preheater stages, a kiln and a cooler unit for cooling the burnt material from the kiln by means of air which is subsequently divided into two streams, one of which is passed through the kiln and up through a kiln string of said preheater while the other stream is passed through a calciner and up through a calciner string of said preheater, comprising feeding raw material to the uppermost cyclone stage of each preheater string, passing the flow of material from the penultimate cyclone stage of said kiln string to the lowermost cyclone stage of said kiln string, passing all of the material from the penultimate cyclone stage of said calciner string to said lowermost cyclone stage of said kiln string, passing the flow of material from the lowermost cyclone stage of said kiln string to said calciner, passing the at least partially calcined material from said calciner to the lowermost cyclone stage of said calciner string, and passing the material from the lowermost cyclone stage of said calciner string to the said kiln for burning.

* * * * *

UNITED STATES PATENT AND TRADEMARK OFFICE
CERTIFICATE OF CORRECTION

PATENT NO. : 4,101,336

DATED : July 18, 1978

INVENTOR(S) : Jorn Touborg

It is certified that error appears in the above–identified patent and that said Letters Patent are hereby corrected as shown below:

Column 2, lines 63-64, delete:

"but adapted for operation in accordance with the invention"

Signed and Sealed this

Third Day of April 1979

[SEAL]

Attest:

RUTH C. MASON
Attesting Officer

DONALD W. BANNER
Commissioner of Patents and Trademarks